United States Patent
Lin et al.

(10) Patent No.: US 12,439,559 B2
(45) Date of Patent: Oct. 7, 2025

(54) HEAT DISSIPATION SYSTEM

(71) Applicant: Acer Incorporated, New Taipei (TW)

(72) Inventors: Yu-Ming Lin, New Taipei (TW);
Wen-Neng Liao, New Taipei (TW);
Cheng-Wen Hsieh, New Taipei (TW);
Tsung-Ting Chen, New Taipei (TW);
Jau-Han Ke, New Taipei (TW);
Chun-Chieh Wang, New Taipei (TW);
Chi-Tai Ho, New Taipei (TW);
Kuan-Lin Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 268 days.

(21) Appl. No.: 18/306,982

(22) Filed: Apr. 25, 2023

(65) Prior Publication Data
US 2023/0354554 A1 Nov. 2, 2023

(30) Foreign Application Priority Data
Apr. 28, 2022 (TW) .................................. 111116260

(51) Int. Cl.
*H05K 7/20* (2006.01)
*G06F 1/20* (2006.01)

(52) U.S. Cl.
CPC ......... *H05K 7/20336* (2013.01); *G06F 1/203* (2013.01); *G06F 1/206* (2013.01); *H05K 7/20172* (2013.01); *H05K 7/20381* (2013.01)

(58) Field of Classification Search
CPC ..... G06F 1/203; G06F 1/206; H05K 7/20336; H05K 7/20172; H05K 7/20381
See application file for complete search history.

(56) References Cited

U.S. PATENT DOCUMENTS

| | | | | | |
|---|---|---|---|---|---|
| 6,002,587 | A | * | 12/1999 | Shusa | H05K 7/1429 361/690 |
| 6,031,721 | A | * | 2/2000 | Bhatia | G06F 1/203 361/679.48 |
| 6,122,167 | A | * | 9/2000 | Smith | H01L 23/427 361/688 |
| 6,175,493 | B1 | * | 1/2001 | Gold | G06F 1/203 361/679.55 |

(Continued)

FOREIGN PATENT DOCUMENTS

| CN | 101174172 A | * | 5/2008 | ............ G06F 1/203 |
|---|---|---|---|---|
| CN | 101174172 B | * | 5/2012 | ............ G06F 1/203 |

(Continued)

*Primary Examiner* — Ljiljana V. Ciric
(74) *Attorney, Agent, or Firm* — JCIPRNET

(57) ABSTRACT

A heat dissipation system suitable for a portable electronic device with two heat sources includes a centrifugal fan, two heat dissipation fin sets, a gate, a first heat pipe, a second heat pipe, and a control unit. The centrifugal fan has a main outlet and a sub outlet. The heat dissipation fin sets are disposed respectively at the main outlet and the sub outlet, and the gate is disposed at the sub outlet. The first heat pipe thermally contacts the heat sources and the heat dissipation fin set located at the main outlet. The second heat pipe thermally contacts one of the heat sources and the two heat dissipation fin sets. The control unit is electrically connected to the gate to drive the gate to open or close the sub outlet based on a load of the two heat sources.

10 Claims, 7 Drawing Sheets

(56) References Cited

U.S. PATENT DOCUMENTS

| | | | |
|---|---|---|---|
| 6,226,178 B1* | 5/2001 | Broder | G06F 1/203 361/679.52 |
| 6,233,146 B1* | 5/2001 | Gilchrist | G06F 1/203 361/689 |
| 6,359,780 B1* | 3/2002 | McMahan | G06F 1/203 361/689 |
| 6,924,978 B2* | 8/2005 | DiStefano | G06F 1/203 361/679.48 |
| 7,071,587 B2* | 7/2006 | Lopatinsky | F04D 25/0653 310/58 |
| 7,155,914 B2* | 1/2007 | Ishinabe | G06F 1/203 257/E23.099 |
| 7,255,532 B2* | 8/2007 | Zheng | F04D 17/16 415/203 |
| 7,277,282 B2* | 10/2007 | Tate | H01L 23/427 257/713 |
| 7,288,895 B2* | 10/2007 | Rossi | H01J 61/52 315/112 |
| 7,325,590 B2* | 2/2008 | Kim | G06F 1/203 165/122 |
| 7,532,467 B2* | 5/2009 | Launay | G06F 1/203 361/679.48 |
| 7,589,962 B1* | 9/2009 | Bhatia | F28D 15/0233 165/104.19 |
| 7,619,889 B2* | 11/2009 | Yu | G06F 1/206 361/689 |
| 7,710,725 B2* | 5/2010 | Takakusaki | G06F 1/1616 361/721 |
| 7,821,782 B2* | 10/2010 | Doherty | G06F 1/1656 361/679.55 |
| 7,969,738 B2* | 6/2011 | Koo | G06F 1/203 136/211 |
| 8,081,267 B2* | 12/2011 | Moscovitch | G06F 1/206 349/59 |
| 8,400,766 B2* | 3/2013 | Kim | H05K 7/20181 361/695 |
| 8,693,184 B2* | 4/2014 | Wu | G06F 1/203 361/709 |
| 9,081,554 B2* | 7/2015 | MacDonald | G06F 1/203 |
| 9,662,906 B2* | 5/2017 | Kobayashi | B41J 11/00214 |
| 9,668,334 B2* | 5/2017 | Refai-Ahmed | G06F 1/203 |
| 9,861,007 B2* | 1/2018 | Yoon | H05K 7/2099 |
| 9,909,813 B2* | 3/2018 | Tamaoka | F28D 15/0275 |
| 9,939,860 B2* | 4/2018 | Zhang | H02J 4/00 |
| 10,068,833 B2* | 9/2018 | Tamaoka | H01L 23/467 |
| 10,165,705 B2* | 12/2018 | Varadarajan | G06F 1/20 |
| 10,529,649 B2* | 1/2020 | Yu | H01L 23/427 |
| 10,606,325 B2* | 3/2020 | Degner | H05K 7/20172 |
| 11,009,924 B2* | 5/2021 | Shabbir | G06F 1/20 |
| 11,262,820 B1* | 3/2022 | North | G06F 1/3296 |
| 11,262,821 B1* | 3/2022 | North | G06F 1/3296 |
| 11,262,822 B1* | 3/2022 | North | H05K 7/20409 |
| 11,324,144 B2* | 5/2022 | Stefanoski | G05D 1/021 |
| 11,397,453 B2* | 7/2022 | Lu | G06F 1/1656 |
| 11,812,389 B2* | 11/2023 | Huang | G06F 1/3278 |
| 11,877,381 B2* | 1/2024 | Cheng | H05K 7/20172 |
| 11,917,792 B2* | 2/2024 | Sultenfuss | H05K 7/20336 |
| 11,968,806 B2* | 4/2024 | Kitamura | G06F 1/203 |
| 12,096,598 B2* | 9/2024 | Sano | H05K 7/20336 |
| 12,108,561 B2* | 10/2024 | Hashiba | G06F 1/203 |
| 12,120,848 B2* | 10/2024 | Wang | H05K 7/20336 |
| 12,137,535 B2* | 11/2024 | Kim | G06F 1/203 |
| 12,146,778 B2* | 11/2024 | Eiland | H05K 7/20281 |
| 12,245,407 B2* | 3/2025 | Rightnowar | B64D 41/00 |
| 12,250,787 B2* | 3/2025 | Kimura | H05K 7/20409 |
| 12,250,792 B2* | 3/2025 | Kitamura | H05K 7/20336 |
| 12,284,793 B2* | 4/2025 | Bawa | F28F 3/12 |
| 2002/0121097 A1* | 9/2002 | Chiu | F28D 15/02 165/104.21 |
| 2002/0179286 A1* | 12/2002 | Sterner | F28D 15/02 257/E23.099 |
| 2005/0103477 A1* | 5/2005 | Kim | G06F 1/203 165/104.33 |
| 2005/0145371 A1* | 7/2005 | DiStefano | G06F 1/20 257/E23.098 |
| 2006/0162340 A1* | 7/2006 | Kuo | G06F 1/20 257/E23.099 |
| 2007/0139880 A1* | 6/2007 | Ouyang | G06F 1/206 361/689 |
| 2008/0112114 A1* | 5/2008 | Liao | G06F 1/203 361/688 |
| 2009/0080157 A1* | 3/2009 | Varadarajan | G06F 1/203 361/697 |
| 2010/0108291 A1* | 5/2010 | Onnerud | G06F 1/203 165/80.2 |
| 2010/0172097 A1* | 7/2010 | Takakusaki | H05K 1/141 361/689 |
| 2010/0195280 A1* | 8/2010 | Huang | G06F 1/203 361/696 |
| 2013/0081779 A1* | 4/2013 | Liao | G05D 23/19 165/11.1 |
| 2013/0312940 A1* | 11/2013 | Huang | G06F 1/20 165/104.34 |
| 2013/0319640 A1* | 12/2013 | Cavallaro | F28F 7/00 165/185 |
| 2014/0254096 A1* | 9/2014 | Fujiwara | H05K 7/20136 361/695 |
| 2016/0363971 A1* | 12/2016 | Delano | G06F 1/203 |
| 2017/0199554 A1* | 7/2017 | Chen | H01L 23/38 |
| 2017/0234623 A1* | 8/2017 | Fried | H05K 7/20809 165/104.26 |
| 2017/0242462 A1* | 8/2017 | Fujiwara | G06F 1/1656 |
| 2018/0076788 A1* | 3/2018 | Decker | H05K 7/20154 |
| 2018/0374777 A1* | 12/2018 | Yu | H01L 23/427 |
| 2019/0014687 A1* | 1/2019 | Snyder | F02K 3/115 |
| 2021/0149463 A1* | 5/2021 | Lu | H05K 7/20154 |
| 2021/0259133 A1* | 8/2021 | Narasimhan | H05K 7/20409 |
| 2021/0378138 A1* | 12/2021 | Wang | G06F 1/203 |
| 2023/0020484 A1* | 1/2023 | Khan | H01L 23/427 |
| 2023/0124239 A1* | 4/2023 | Kitamura | G06F 1/203 361/689 |
| 2023/0247810 A1* | 8/2023 | Schumacher | H05K 7/20936 62/117 |
| 2023/0328930 A1* | 10/2023 | Lin | H05K 7/20409 361/697 |
| 2023/0337406 A1* | 10/2023 | Bawa | H05K 7/2099 |
| 2023/0354554 A1* | 11/2023 | Lin | H05K 7/20172 |
| 2023/0363104 A1* | 11/2023 | Narasimhan | H05K 7/20163 |
| 2023/0397363 A1* | 12/2023 | Cheng | H05K 7/20172 |
| 2024/0019898 A1* | 1/2024 | Patel | G06F 1/263 |
| 2024/0138099 A1* | 4/2024 | He | H05K 7/2039 |

FOREIGN PATENT DOCUMENTS

| | | | | |
|---|---|---|---|---|
| EP | 1531384 A2 | * | 5/2005 | G06F 1/203 |
| TW | 201520743 A | * | 6/2015 | |
| TW | I497266 | | 8/2015 | |
| TW | I675616 B | * | 10/2019 | |
| TW | M619677 U | * | 11/2021 | |
| TW | I816999 B | * | 10/2023 | |

* cited by examiner

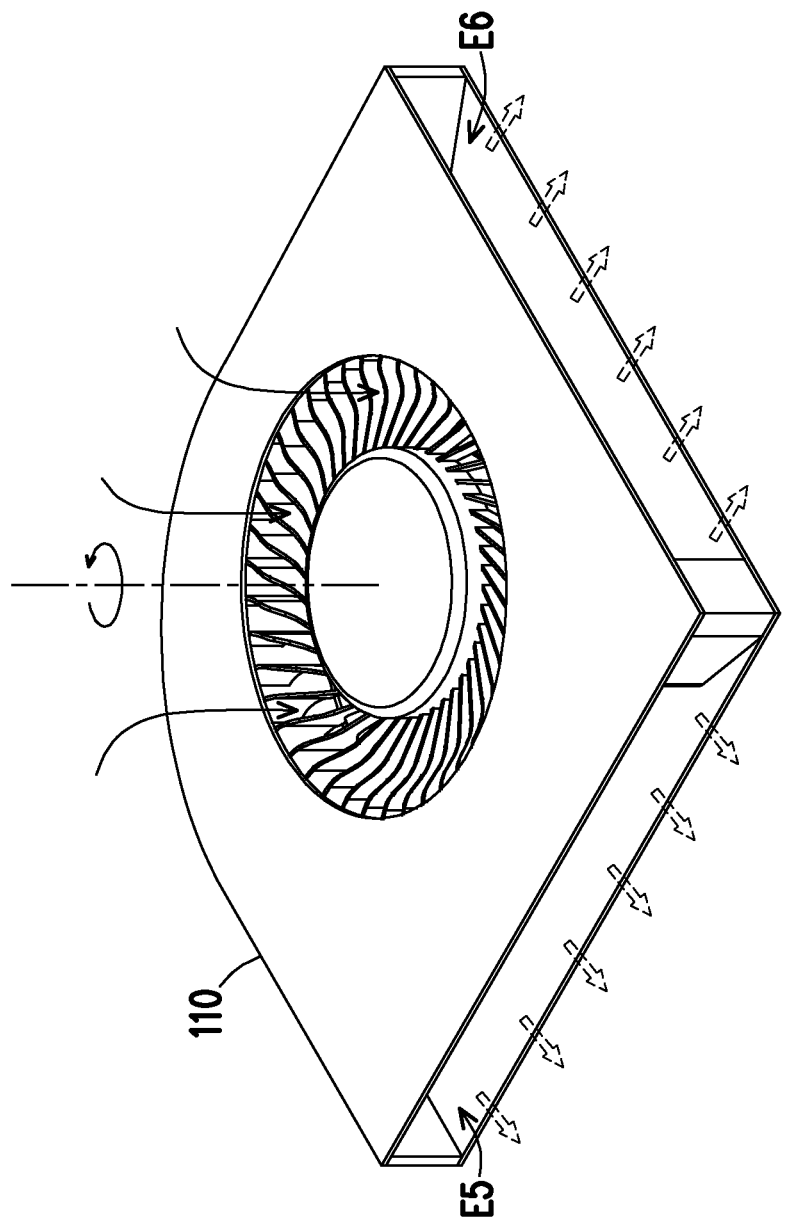

HEAT DISSIPATION SYSTEM

CROSS-REFERENCE TO RELATED APPLICATION

This application claims the priority benefit of Taiwan application serial no. 111116260, filed on Apr. 28, 2022. The entirety of the above-mentioned patent application is hereby incorporated by reference herein and made a part of this specification.

BACKGROUND

Technical Field

The disclosure relates to a heat dissipation system.

Description of Related Art

With the change of people's computer habits, laptops have become a very important product type in the market. Laptops are small and portable, so people often take them with them to work, to do some paperwork in the office, to read articles or videos online at a coffee shop, or to play a few video games with their friends. If the user specifically requires the smoothness or detail of the video game on the laptop, then the laptop needs to be equipped with a higher-end processor and display chip. However, higher-end processors and display chips are associated with the problem of excessive heat generation, and the size of laptops is limited, so the design of heat dissipation is often less than ideal.

Traditionally, some laptops are designed with fans to carry the heat out of the laptop using air flow. However, as the performance of laptops becomes more and more advanced, the heat generated by laptops also increases dramatically, and as laptops are used in different states, there is a need for different heat dissipation conditions to meet various heat dissipation needs in an efficient way.

SUMMARY

The disclosure provides a heat dissipation system in which a gate is driven to open and close a sub outlet of a dual outlet fan according to a load state of heat sources, and an efficient heat dissipation means is provided to meet different heat dissipation needs.

The heat dissipation system of the disclosure is suitable for a portable electronic device with multiple heat sources. The heat dissipation system includes a fan, two heat dissipation fin sets, a gate, a first heat pipe, a second heat pipe, and a control unit. The fan is a centrifugal fan and has a main outlet and a sub outlet, the heat dissipation fin sets are disposed respectively at the main outlet and the sub outlet, and the gate is disposed at the sub outlet. The first heat pipe thermally contacts the heat sources and the heat dissipation fin set located at the main outlet. The second heat pipe thermally contacts one of the heat sources and the two heat dissipation fin sets. The control unit is electrically connected to the gate to drive the gate to open or close the sub outlet according to a load of the heat sources.

Based on the above, the portable electronic device has multiple heat sources, the fan of the heat dissipation system has the main outlet and the sub outlet, and the heat sources thermally contact the heat dissipation fin at the main outlet and the sub outlet by different heat pipes, and the sub outlet is controlled by the gate to open or close to form a two-way heat dissipation path or a one-way heat dissipation path. In this way, the control unit may correspondingly open and close the sub outlet according to the respective load state of the heat sources, and use the two-way heat dissipation path or the one-way heat dissipation path as a heat dissipation means to meet different heat dissipation needs.

In other words, since the internal space of the portable electronic device is a multi-heat source setting environment, different load states will exist with different usage conditions, which cannot be handled by the single heat dissipation means of existing technology. Therefore, it is necessary to use the heat dissipation system of the disclosure to provide the corresponding heat dissipation means according to the load state of the heat sources by setting the fan, the heat pipe, and the gate, so that the heat dissipation system may improve the heat dissipation efficiency and optimize the operation efficiency.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A is a schematic diagram of a first fan of FIG. 1.

DESCRIPTION OF THE EMBODIMENTS

Figure 1:
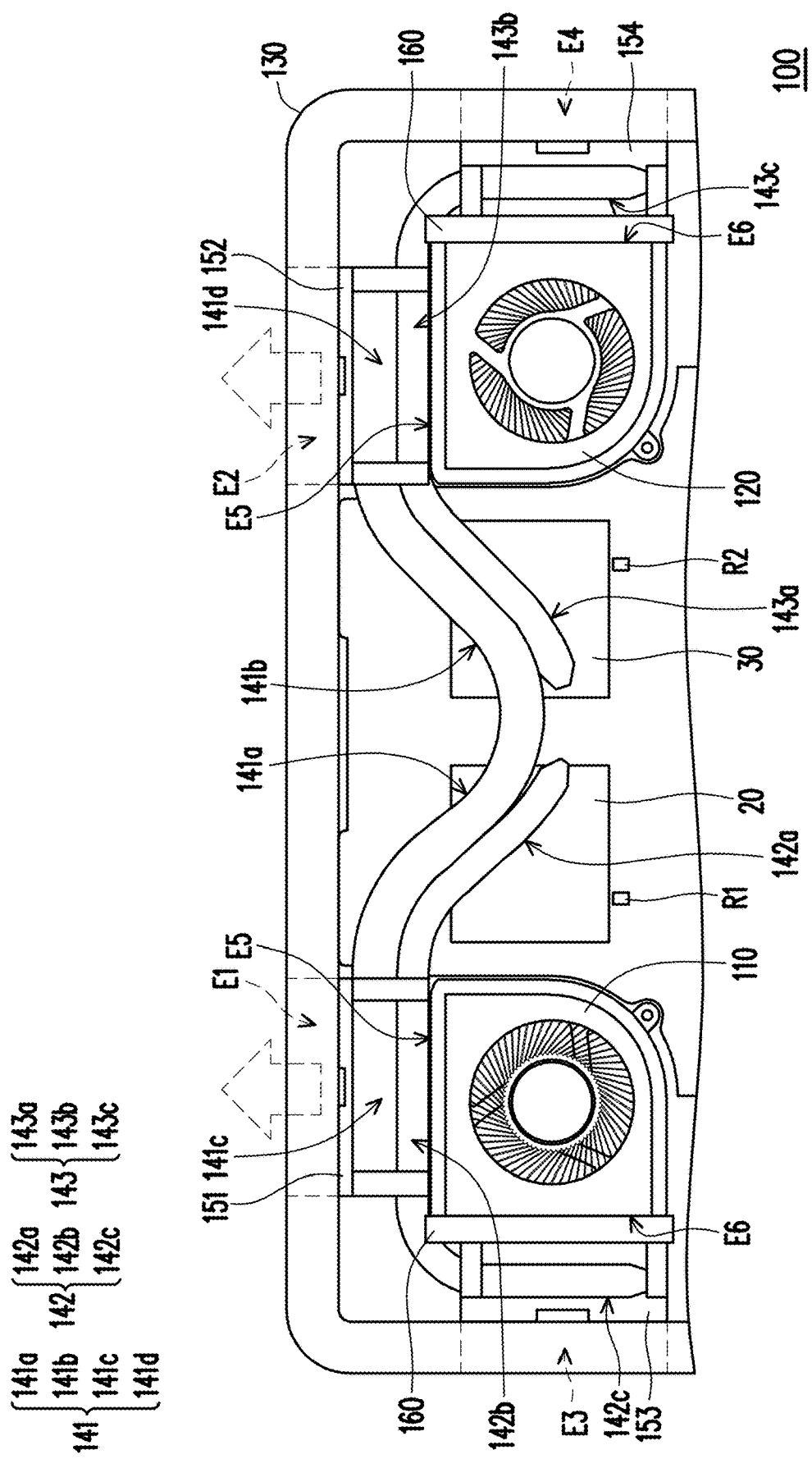
FIG. 1 is an internal schematic diagram of a portable electronic device according to an embodiment of the disclosure.
Figure 2:
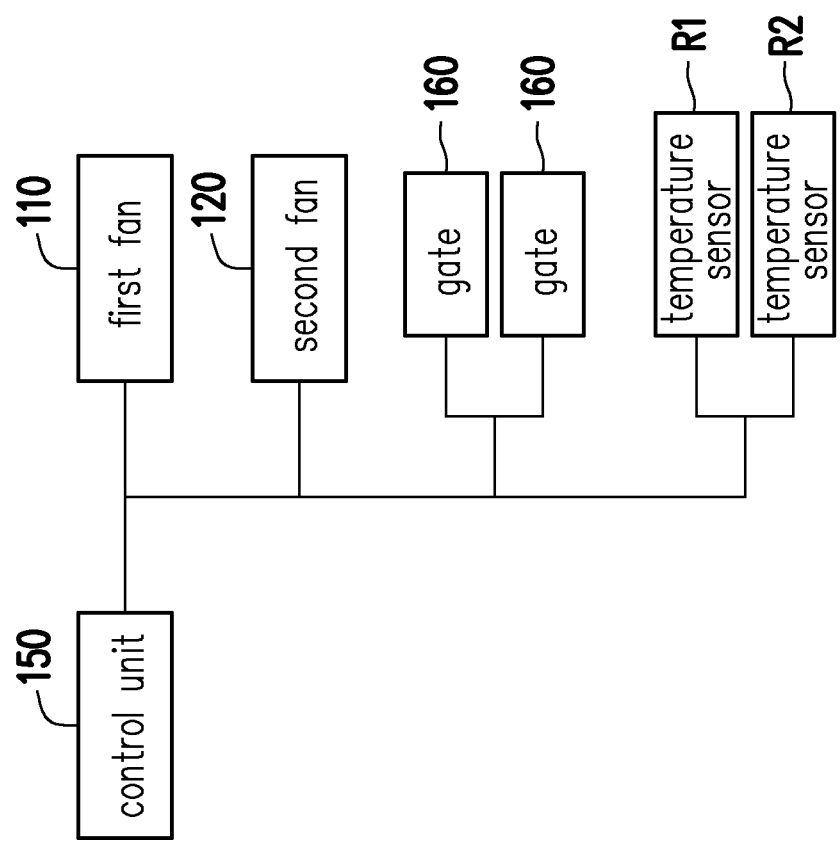
FIG. 2 is a schematic diagram of electrical connection of relevant components of a heat dissipation system of the disclosure.

FIG. 1 is an internal schematic diagram of a portable electronic device according to an embodiment of the disclosure, and only a part related to the technical features of this embodiment is shown here. FIG. 2 is a schematic diagram of electrical connection of relevant components of a heat dissipation system of the disclosure. Referring to FIG. 1 and FIG. 2 at the same time, according to this embodiment, a heat dissipation system 100 is suitable for a portable electronic device (e.g. a laptop computer or a tablet computer) with two heat sources 20 and 30. The heat sources 20 and 30 are disposed in the internal space of a casing 130. The heat source 20 is, for example, a display chip (GPU), and the heat source 30 is, for example, a central processing unit (CPU). The heat dissipation system 100 includes a first fan 110, a second fan 120, heat dissipation fin sets 151 to 154, a gate 160, a first heat pipe 141, a second heat pipe 142, a third heat pipe 143, and a control unit 150. It should be noted here that the serial numbers added to the names of the components of the disclosure, such as first, second, are for identification purposes only, and the structural features of the components themselves are actually the same.

The first fan 110 and the second fan 120 are centrifugal fans respectively, and each has a main outlet E5 and a sub outlet E6. The heat dissipation fin sets 151 to 154 are respectively disposed at the main outlets E5 and the sub outlets E6. The gate 160 is respectively disposed at the sub outlets E6. The casing 130 further has multiple exhaust vents E1 to E4 corresponding to the heat dissipation fin sets 151 to 154, the main outlets E5, and the sub outlets E6, respectively, as shown in FIG. 1.

Taking the casing 130 of the portable electronic device 100 as a reference, the heat dissipation system 100 is disposed in the casing 130, the main outlets E5 are located on a rear side of the casing 130, and the sub outlets E6 are located on a side of the casing 130. Taking a laptop computer as an example, a user operates the portable electronic device from a front side of the casing 130, the rear side is a pivot point between the casing 130 and a screen (not shown), and the front side and the rear side are two sides of the casing 130 opposite each other.

Furthermore, the first heat pipe 141 according to this embodiment thermally contacts the heat sources 20 and 30, and the heat dissipation fin sets 151 and 152 located at the main outlets E5. The second heat pipe 142 thermally contacts one of the heat sources (i.e., the heat source 20), and thermally contacts the heat dissipation fin sets 151 and 153 at the main outlet E5 and the sub outlet E6 of the same fan (i.e., the first fan 110). The third heat pipe 143 thermally contacts the other one of the heat sources (i.e., the heat source 30), and thermally contacts the heat dissipation fin sets 152 and 154 at the main outlet E5 and the sub outlet E6 of the same fan (i.e., the second fan 120). The thermal contact here refers to the smooth transfer of heat between components, not limited to structural contact.

Further, the first heat pipe 141 has a heat absorption section 141a thermally contacting the heat source 20, a heat absorption section 141b thermally contacting the heat source 30, a heat dissipation section 141c thermally contacting the heat dissipation fin set 151, and a heat dissipation section 141d thermally contacting the heat dissipation fin set 152. Therefore, heat generated by the heat source 20 is absorbed from the heat absorption section 141a, and then transmitted to the heat dissipation section 141c, and the heat is smoothly discharged from the casing 130 through the exhaust vent E1 by air flow generated from the main outlet E5 by the heat dissipation fin set 151 and the first fan 110. Relatively, heat generated by the heat source 30 is absorbed from the heat absorption section 141b, and then transmitted to the heat dissipation section 141d, and the heat is smoothly discharged from the casing 130 through the exhaust vent E2 by air flow generated from the main outlet E5 by the heat dissipation fin set 152 and the second fan 120.

The second heat pipe 142 has a heat absorption section 142a thermally contacting the heat source 20, a heat dissipation section 142b thermally contacting the heat dissipation fin set 151, and a heat dissipation section 142c thermally contacting the heat dissipation fin set 153. Therefore, heat generated by the heat source 20 is absorbed from the heat absorption section 142a, and then transmitted to the heat dissipation section 142b and the heat dissipation section 141c, and the heat is smoothly discharged from the casing 130 through the exhaust vent E1 by air flow generated from the main outlet E5 by the heat dissipation fin set 151 and the first fan 110, and another portion of the heat is smoothly discharged from the casing 130 through the exhaust vent E3 by air flow generated from the sub outlet E6 by the heat dissipation fin set 153 and the first fan 110.

The third heat pipe 143 has a heat absorption section 143a thermally contacting the heat source 30, a heat dissipation section 143b thermally contacting the heat dissipation fin set 152, and a heat dissipation section 143c thermally contacting the heat dissipation fin set 154. Therefore, heat generated by the heat source 30 is absorbed from the heat absorption section 143a, and then transmitted to the heat dissipation section 143b and the heat dissipation section 143c, and the heat is smoothly discharged from the casing 130 through the exhaust vent E2 by air flow generated from the main outlet E5 by the heat dissipation fin set 152 and the second fan 120, and another portion of the heat is smoothly discharged from the casing 130 through the exhaust vent E4 by air flow generated from the sub outlet E6 by the heat dissipation fin set 154 and the second fan 120.

Based on the corresponding configuration of the first heat pipe 141, the second heat pipe 142, and the third heat pipe 143, the heat generated by the heat sources 20 and 30 may be smoothly dissipated out of the casing 130, respectively. Here, the heat transfer technology of the heat pipe is known, and therefore will not be repeated in the following.

Furthermore, referring to FIG. 2, the heat dissipation system 100 further includes temperature sensors R1 and R2 correspondingly disposed beside the heat sources 20 and 30 and do not affect each other, so as to sense temperature of the heat sources 20 and 30 respectively. The control unit 150 is electrically connected to the first fan 110, the second fan 120, the gate 160, and the temperature sensors R1 and R2. The control unit 150 drives the gate 160 to open or close the sub outlets E6 of the first fan 110 and the second fan 120 according to temperature sensing values of the two temperature sensors R1 and R2. Here, the control unit 150 may be another control chip or control circuit in the portable electronic device different from the central processing unit (i.e., the heat source 30), or may be the central processing unit itself.

Figure 3B:
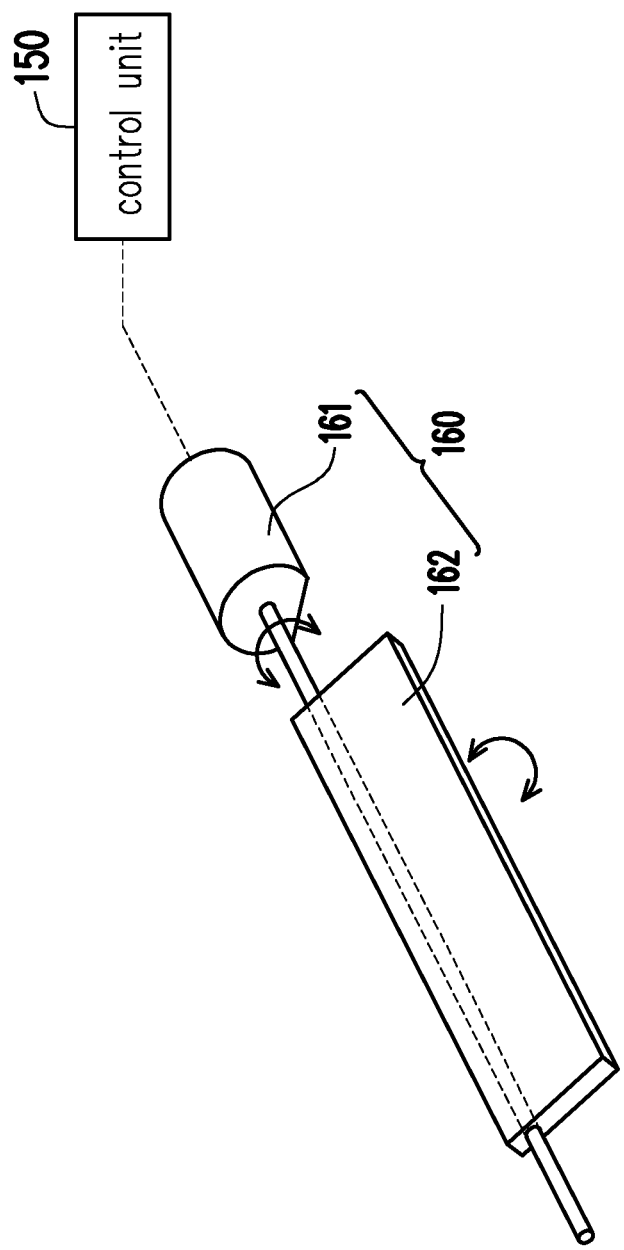
FIG. 3B is a schematic diagram of a gate of FIG. 1.

FIG. 3A is a schematic diagram of a first fan of FIG. 1. FIG. 3B is a schematic diagram of a gate of FIG. 1. Referring to FIG. 3A and FIG. 3B and comparing with FIG. 1, it should be mentioned first that the first fan 110 and the second fan 120 are centrifugal fans with dual outlets and are identical in structure to each other, with only the top and bottom inverted in the configuration shown in FIG. 1. Furthermore, for the individual first fan 110 or the second fan 120, quantity of flow of air flow when the main outlet E5 and the sub outlet E6 are both open is 120% of quantity of flow of air flow when the main outlet E5 is open and the sub outlet E6 is closed, while maintaining the same system noise. However, the static pressure generated by the fan (the first fan 110 or the second fan 120) will decrease due to the increase in the number of outlets (both the main outlet E5 and the sub outlet E6 are open). Accordingly, with the outlet diameter or the outline of the flow channel, a ratio of the quantity of flow of air flow of the main outlet E5 to the quantity of flow of air flow of the sub outlet E6 according to this embodiment may be adjusted=6:4. In addition, the gate 160 disposed at the sub outlet E6 includes a motor 161 and a baffle 162. The control unit 150 is electrically connected to the motor 161, and the baffle 162 is connected to the motor 161 and is driven by the motor 161 to rotate up or down to open or close the sub outlet E6 (also equivalent to increasing or decreasing the number of the outlets). A designer may adjust the ratio of quantity of flow appropriately according to the needs.

Based on the configuration of the components, the control unit 150 of the disclosure may drive the gate 160 to open or close the sub outlet E6 according to the load state of the heat sources 20 and 30, and achieve the required heat dissipation effect by efficient means, as described in detail below.

Figure 4:
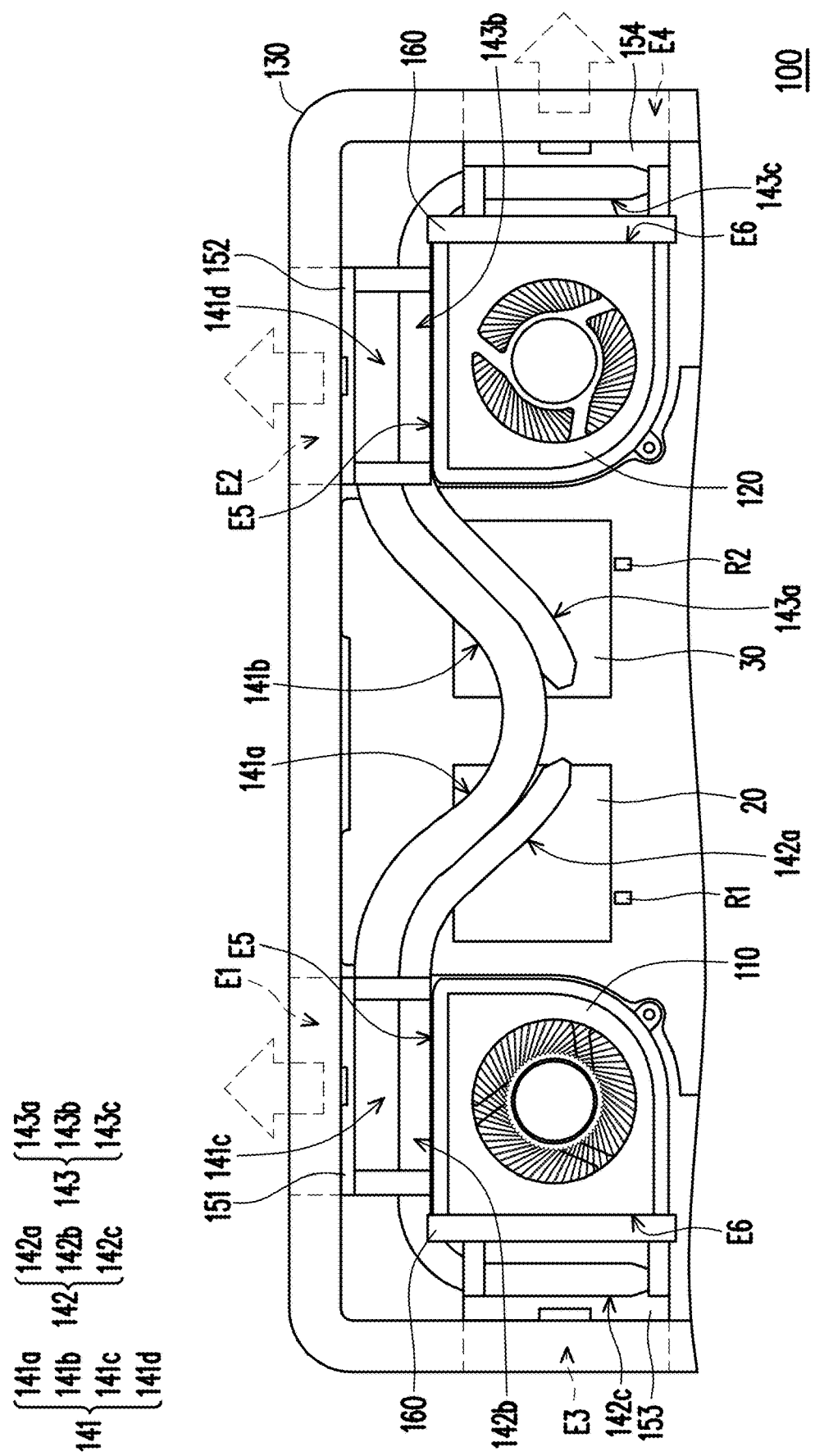
FIG. 4 and FIG. 5 are schematic diagrams of the heat dissipation system of FIG. 1 in different states, respectively.
Figure 5:
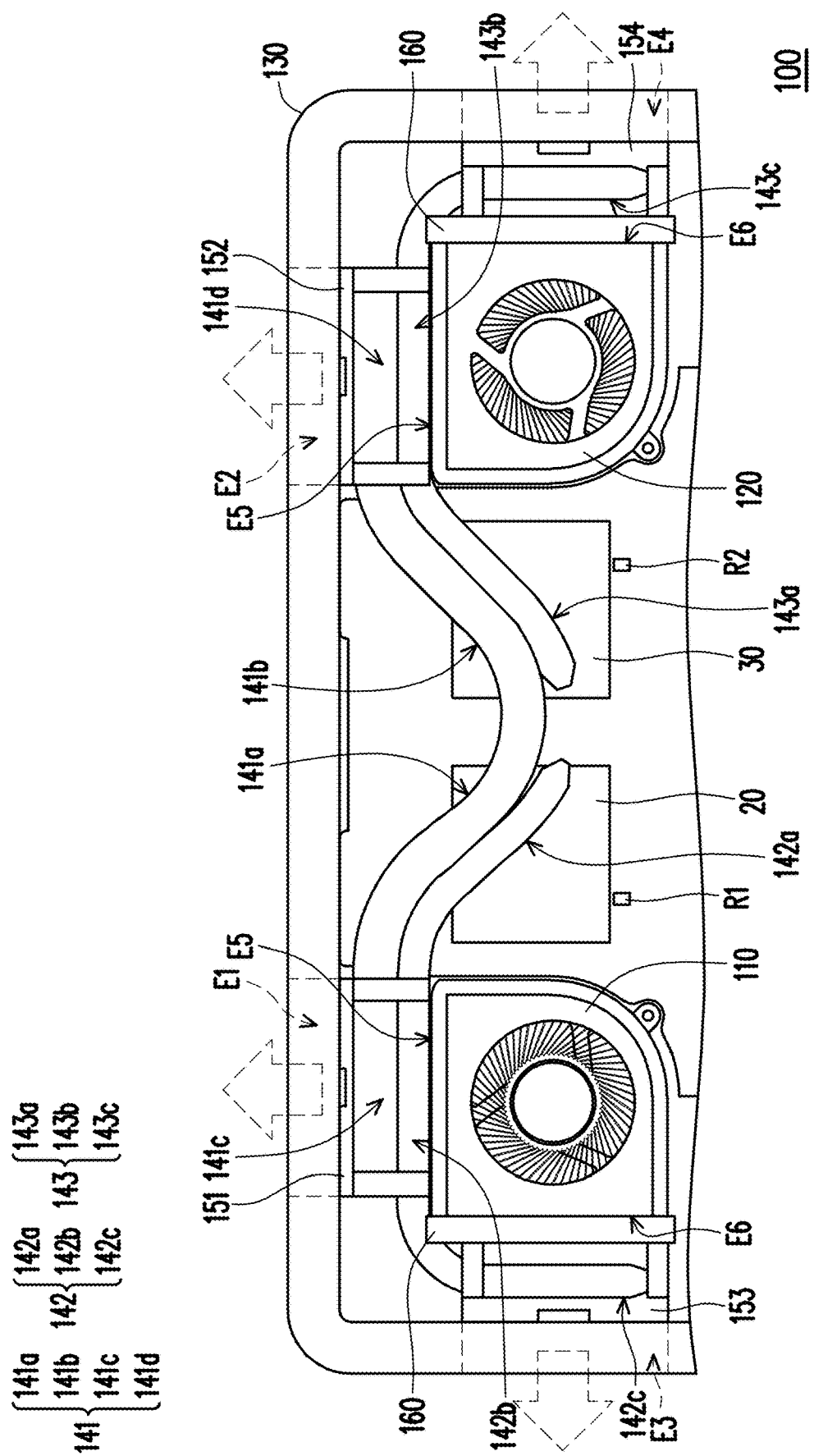

FIG. 4 and FIG. 5 are schematic diagrams of the heat dissipation system of FIG. 1 in different states, respectively.

Referring to FIG. 1, FIG. 4, and FIG. 5 at the same time, since the first fan 110 and the second fan 120 according to this embodiment have the features related to air flow, it is necessary to adjust the opening and closing state of the sub outlet E6 of the first fan 110 and the second fan 120 in response to the different load states of the heat sources 20 and 30 in order to optimize the operation efficiency of the heat dissipation system 100.

First, as shown in FIG. 1, the heat sources 20 and 30 are at low load, so the control unit 150 drives the gate 160 to close the respective sub outlets E6 of the first fan 110 and the second fan 120, that is, in this state, it is sufficient for the first fan 110 and the second fan 120 to dissipate the heat from the heat source 20 and 30 with the air flow generated by their respective main air outlets E5. In other words, the first fan 110 and the second fan 120 may each smoothly dissipate the heat generated by the heat sources 20 and 30 at low loads with a single outlet. At the same time, this may also avoid the noise generated by multiple outlets and increase the comfort level of the user when operating the portable electronic device.

Next, as shown in FIG. 4, the heat source 30 is at high load while the heat source 20 is at low load. Therefore, the control unit 150 drives the gate 160 at the second fan 120 to open the sub outlet E6 corresponding to the exhaust vent E4, so that the air flow of the second fan 120 may be increased to facilitate the heat dissipation for the heat source 30 at high load. At the same time, the first fan 110 and the gate 160 located there maintain in the same state as shown in FIG. 1, thus avoiding unnecessary energy waste.

Conversely, when the heat source 30 is at a low load and the heat source 20 is at a high load, the gate 160 at the first fan 110 is opened instead, while the gate 160 at the second fan 120 is left closed.

Next, as shown in FIG. 5, the heat sources 20 and 30 are in a high load state, then the control unit 150 drives the two gates 160 to open the sub outlets E6 of the first fan 110 and the second fan 120, so that the first fan 110 and the second fan 120 are in a dual outlet heat dissipation state to facilitate full heat dissipation of the heat sources 20 and 30.

To put it simply, for a single fan (the first fan 110 or the second fan 120), if the air flow generated by opening only the main outlet E5 is defined as 1 unit, and the air flow may be increased by 20% by additionally opening the sub outlet E6, then the combined air flow of the main outlet E5 and the sub outlet E6 is 1.2 units. In response to the location of the main outlet E5 and the sub outlet E6 in relation to the centrifugal fan, a ratio of the quantity of flow of air flow between the main outlet E5 and the sub outlet E6 is designed as follows: the quantity of flow of air flow of the main outlet E5: the quantity of flow of air flow of the sub outlet E6=6:4, so when the fan is maintained in a dual outlet state, the quantity of flow of air flow of the main outlet E5 drops to 0.72 units, while the quantity of flow of air flow of the sub outlet E6 is 0.48 units. Therefore, based on the air flow characteristics of the fan, supplemented by the control unit 150 that can control the opening and closing status of the sub outlet E6 by driving the gate 160, the air flow may be effectively distributed and optimized. In other words, the heat dissipation and operational flexibility of the heat dissipation system 100 may be improved without increasing the number of fans and maintaining the internal space of the portable electronic device.

Figure 6:
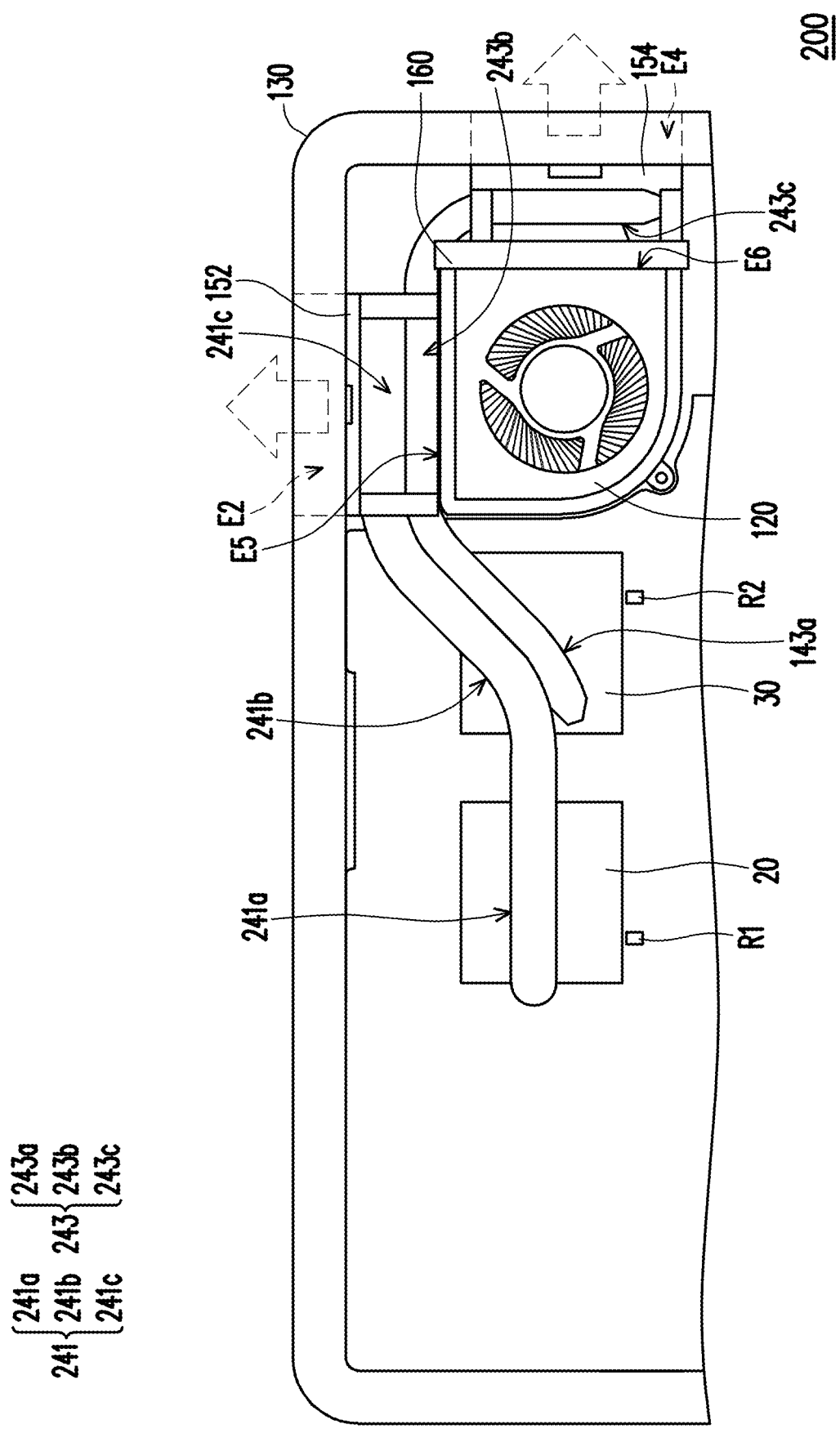
FIG. 6 is a schematic diagram of a heat dissipation system according to another embodiment of the disclosure.

FIG. 6 is a schematic diagram of a heat dissipation system according to another embodiment of the disclosure. Referring to FIG. 6, according to this embodiment, a heat dissipation system 200 includes the second fan 120 and heat pipes 241 and 243, which are equivalent to the configuration of the second fan 120 on the right side retained in the previous embodiment. The heat pipes 241 and 243 are equivalent to the partial first heat pipe 141 and the second heat pipe 142. The heat pipe 241 has a heat absorption section 241a thermally contacting the heat source 20, a heat absorption section 241b thermally contacting the heat source 30, and a heat dissipation section 241c thermally contacting the heat dissipation fin set 152, so that the heat may be dissipated in the heat dissipation section 241c after the heat is absorbed from the heat sources 20 and 30. The heat pipe 243 has a heat absorption section 243a thermally contacting the heat source 30, a heat dissipation section 243b thermally contacting the heat dissipation fin set 152, and a heat dissipation section 243b thermally contacting the heat dissipation fin set 154, so that the heat may be dissipated in the heat dissipation sections 243b and 243c respectively after the heat is absorbed from the heat source 30. In other words, the disclosure has been able to distribute the quantity of air flow and improve the efficiency of the heat dissipation system 200 for multiple heat sources 20 and 30 with a single fan.

To sum up, according to the embodiments of the disclosure, the portable electronic device has multiple heat sources, the fan of the heat dissipation system has the main outlet and the sub outlet, and the heat sources thermally contact the heat dissipation fin at the main outlet and the sub outlet by different heat pipes, and the sub outlet is controlled by the gate to open or close to form a two-way heat dissipation path or a one-way heat dissipation path. In this way, the control unit may correspondingly open and close the sub outlet according to the respective load state of the heat sources, and use the two-way heat dissipation path or the one-way heat dissipation path as a heat dissipation means to meet different heat dissipation needs, so that the heat dissipation system may improve the heat dissipation efficiency and optimize the operation efficiency.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A heat dissipation system suitable for a portable electronic device, wherein the portable electronic device has two heat sources, and the heat dissipation system comprises:
   a centrifugal fan, having a main outlet and a sub outlet;
   two heat dissipation fin sets disposed respectively at the main outlet and the sub outlet;
   a gate disposed at the sub outlet;
   a first heat pipe thermally contacting the two heat sources, and thermally contacting the heat dissipation fin set located at the main outlet;
   a second heat pipe thermally contacting one of the two heat sources, and thermally contacting the two heat dissipation fin sets; and
   a control unit electrically connected to the gate, wherein the control unit drives the gate to open or close the sub outlet according to a load of the two heat sources.

2. The heat dissipation system according to claim 1 further comprising two temperature sensors, wherein the two temperature sensors are respectively disposed beside the two heat sources and do not affect each other to sense temperature of the two heat sources respectively, the two temperature sensors are respectively electrically connected to the control unit, and the control unit drives the gate to open or close the sub outlet based on the temperature values sensed by the two temperature sensors.

3. The heat dissipation system according to claim 1, wherein, provided that fan blades rotate at the same speed, the quantity of air flow when the main outlet and the sub outlet are both open is 120% of the quantity of air flow when the main outlet is open and the sub outlet is closed.

4. The heat dissipation system according to claim 1, wherein the ratio of the quantity of air flow through the main outlet to the quantity of air flow through the sub outlet is 6:4.

5. The heat dissipation system according to claim 1, wherein the two heat sources comprise a central processing unit and a display chip, and the second heat pipe thermally contacts the central processing unit.

6. The heat dissipation system according to claim 1 further comprising a third heat pipe, another centrifugal fan, another gate, and another two heat dissipation fin sets, wherein the other two heat dissipation fin sets are located respectively at a main outlet and a sub outlet of the other centrifugal fan, the other gate is located at the sub outlet of the other centrifugal fan, the third heat pipe thermally contacts the other one of the two heat sources and the other two heat dissipation fin sets, the first heat pipe further thermally contacts the heat dissipation fin set located at the main outlet of the other centrifugal fan, the other gate is electrically connected to the control unit, and the control unit drives the other gate to open or close the sub outlet of the other centrifugal fan according to heat output of the two heat sources.

7. The heat dissipation system according to claim 6, wherein the two heat sources are located between the centrifugal fan and the other centrifugal fan.

8. The heat dissipation system according to claim 6, wherein the two heat sources comprise a central processing unit and a display chip, and the third heat pipe thermally contacts the display chip.

9. The heat dissipation system according to claim 1, wherein the portable electronic device comprises a casing, and the heat dissipation system is suitable for being disposed in the casing, wherein the main outlet is located at a rear side of the casing, the sub outlet is located at another side of the casing, and the portable electronic device is operable by a user from a front side of the casing, the front side and the rear side being opposite to each other.

10. The heat dissipation system according to claim 9, wherein the casing has a plurality of exhaust vents to correspond to the main outlet and the sub outlet respectively.

* * * * *